US011772728B2

(12) United States Patent
Ardmar et al.

(10) Patent No.: US 11,772,728 B2
(45) Date of Patent: Oct. 3, 2023

(54) ADAPTER FOR A BIKE MOUNT

(71) Applicant: Thule Sweden AB, Hillerstorp (SE)

(72) Inventors: David Ardmar, Bankeryd (SE); Parke Pleasants, Louisville, CO (US); Michael Schmidt, Lafayette, CO (US); Philip Hazeltine, Longmont, CO (US); Daniel Karlsson, Varnamo (SE); Mark Thibadeau, Longmont, CO (US); Eric Hassett, Golden, CO (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 17/955,197

(22) Filed: Sep. 28, 2022

(65) Prior Publication Data

US 2023/0017641 A1    Jan. 19, 2023

Related U.S. Application Data

(63) Continuation of application No. 17/362,422, filed on Jun. 29, 2021, now Pat. No. 11,459,048.

(30) Foreign Application Priority Data

Jul. 3, 2020 (EP) .................................. 20184005

(51) Int. Cl.
*B62H 3/08* (2006.01)
*B60R 9/048* (2006.01)
*B60R 9/10* (2006.01)

(52) U.S. Cl.
CPC .............. *B62H 3/08* (2013.01); *B60R 9/048* (2013.01); *B60R 9/10* (2013.01)

(58) Field of Classification Search
CPC .............. B62H 3/08; B60R 9/048; B60R 9/10
See application file for complete search history.

(56) References Cited

U.S. PATENT DOCUMENTS

| 5,588,661 A | 12/1996 | Wolfe | |
|---|---|---|---|
| 9,873,385 B2* | 1/2018 | Tsai | B60R 9/048 |
| 2008/0054035 A1* | 3/2008 | Walker | B60R 9/048 |
| | | | 224/403 |
| 2011/0139840 A1* | 6/2011 | Kraeuter | B60R 9/10 |
| | | | 224/400 |
| 2011/0168749 A1 | 7/2011 | Book et al. | |
| 2015/0210222 A1* | 7/2015 | Kisaka | B60R 9/10 |
| | | | 224/42.38 |
| 2015/0239403 A1 | 8/2015 | Flaherty | |
| 2018/0297537 A1* | 10/2018 | Lesley | B60R 9/10 |

FOREIGN PATENT DOCUMENTS

| DE | 20 2015 003 646 U1 | 9/2016 |
|---|---|---|
| EP | 3 590 765 A1 | 1/2020 |
| WO | 2018/211322 A1 | 11/2018 |

OTHER PUBLICATIONS

European Search Report and Written Opinion for European Patent Application No. 20184005.5, dated Oct. 2, 2020 (5 pages).

* cited by examiner

*Primary Examiner* — Ko H Chan (74) *Attorney, Agent, or Firm* — Sterne, Kessler, Goldstein & Fox P.L.L.C.

(57) ABSTRACT

An adapter for a bike mount including a coupling plate, a first adapter section coupled to the coupling plate, and a second adapter section coupled to the coupling plate. The first adapter section is configured to receive a first bike axle. The second adapter section is configured to receive a second bike axle different than the first bike axle.

20 Claims, 3 Drawing Sheets

ADAPTER FOR A BIKE MOUNT

CROSS REFERENCE TO RELATED APPLICATION

This application is a continuation of and claims priority to U.S. application Ser. No. 17/362,422, filed Jun. 29, 2021, which claims priority to EP Application No. 20184005.5, filed Jul. 3, 2020. Each of these applications is incorporated herein in its entirety by reference.

TECHNICAL FIELD

The technical field relates to an adapter for a bike mount. Furthermore, the present disclosure relates to a bike mount suitable for receiving such an adapter, a bike mount system comprising a bike mount and an adapter, a bike carrier comprising such a bike mount system as well as a bike carrier case comprising such a bike carrier.

BACKGROUND

Today, different bike axle mount types with different dimensions including a thru axle mount type or a quick release skewer mount type are available. While every specific bike axle mount type has its benefits, the vast variety of different dimensions need fixation options for mounting bikes with different bike axle mount types to supporting units such as bike carriers and bike cases. It is known to provide standardized bike mounts that are adaptable to different dimensions by means of adapters. Known adapters are insertable in the bike mount so as to change the dimension of the bike mount to a specific bike axle mount type. Usually, a set of distinct and different adapters is provided by the bike mount manufacturer. Each adapter is configured to change the dimension of the bike mount to a single specific bike axle mount type. However, adapters that are currently not in use have to be stowed for a later use. Often, adapters that are not in use are lost due to their small size.

SUMMARY

In view of the foregoing drawbacks, it is the object of the disclosure to provide an enhanced adapter and an enhanced bike mount which at least reduce the foregoing disadvantages of the prior art.

The object is solved by an adapter according to independent claim 1 and a bike mount according to independent claim 11. Advantageous further formations are subject of the dependent claims.

In addition, other desirable features and characteristics will become apparent from the summary and detailed description, and the appended claims, taken in conjunction with the accompanying drawings.

Described is an adapter fixable to a bike mount of a bike supporting unit for changing the dimension of the bike mount such that a predetermined bike axle mount type of several bike axle mount types may be supported on the bike mount. The bike axle mount types may include a thru axle mount type or a quick release skewer mount type. The thru axle mount type may comprise different sizes. The adapter is configured as multiway adapter comprising at least two different adapter sections. Each adapter section is provided to adapt the bike mount to a specific one of the different bike axle mount types. Accordingly, by means of the adapter, the bike mount can be adapted to at least two different bike axle mount types.

The adapter may comprise at least one adapter portion. The adapter portion may define at least one of the different adapter sections. The at least one adapter portion may comprise a first mounting orientation in which the adapter portion provides a first fixation option for a first bike axle mount type. The at least one adapter portion that may comprise a second mounting orientation in which the adapter portion provides a second fixation option for a second bike axle Mount type. The adapter may be configured such that a change between the first mounting orientation and the second mounting orientation is achieved by turning the adapter about a turning axis.

The adapter may comprise at least two adapter portions. The at least two adapter portions may be arranged laterally offset with respect to each other. The adapter portions may be coupled to each other by means of a coupling portion such that the adapter is formed as an integral unit.

The coupling portion may be formed such that the positions of the at least two adapter portions are simultaneously changeable by rotating the adapter about a rotational axis. The rotational axis may be a middle axis of the adapter. The rotational axis may be a bike wheel rotational axis or another axis which is parallel to the bike wheel rotational axis or the middle axis. The adapter portions may be paraxially arranged with respect to the rotational axis. In addition or alternatively, the coupling portion may be formed rigid.

The adapter may be configured as a plug-like adapter which is at least partially insertable into a corresponding socket-like mounting portion provided in the bike mount. The socket-like mounting portion may be a recess formed in the bike mount. The recess may comprise an opening into which a mounting portion of the adapter or an adapter section which is not in use may be inserted.

The coupling portion may comprise a coupling plate. The coupling plate may be a polygonal coupling plate. For example, the coupling plate may be a triangular coupling plate. The adapter portions may be arranged in corner regions or longitudinal end portions of the coupling portion. A reinforcing rib may be provided on the coupling portion for at least partially reinforcing the coupling portion in an area between two of the adapter portions.

At least one adapter portion of the at least two adapter portions may extend on both sides of the coupling portion such that the adapter sections are arranged on opposite sides of the coupling portion. In particular, the adapter sections may protrude from both sides of the coupling portion. Two or more adapter portions may protrude from opposite sides of the coupling portion. Adjacent adapter sections on the same side may comprise different lengths such that the adapter sections do not interfere with bike axle mount types to be mounted. However, adjacent adapter section on the same side of the coupling portion may also comprise the same length.

The adapter may comprise at least one positioning portion allowing to correctly position one of the adapter portions in a supporting portion of the bike mount. Such a positioning may be achieved by a contact of the at least one positioning portion with a mating positioning portion on the bike mount. The adapter may be configured, such that a correct position is present when a middle axis of one adapter portion to be used for bike fixation is aligned with a middle axis of an opening in the supporting portion.

The positioning portion may be a portion of the coupling portion. In particular, the positioning portion may be an edge portion of the coupling portion, for example of the plate-like coupling portion. In addition or alternatively, the positioning portion may be a portion of an adapter portion. For example, the positioning portion may be an outer circumferential surface of the adapter sections. Such an outer circumferential surface of the adapter sections may be configured to contact an inner surface of the supporting portion. The inner surface of the supporting portion may be configured as a curved surface with a curvature corresponding to the curvature of the outer circumferential surfaces.

Each adapter section may comprise an opening for passing a fixation axle therethrough. In addition or alternatively, adjacent adapter sections on the same side of the coupling portion may comprise openings with different diameters for inserting axles of different diameters therein. For example, the diameters of such openings may be 12 mm or 15 mm for receiving a thru axle therein. The diameter may also be 5 mm for receiving a quick release skewer type axle therein. In addition or alternatively, the adapter sections may comprise different lengths for extending a width of the bike mount, for example to 100 mm or 110 mm.

Also disclosed is a bike mount. The bike mount may comprise a fixation portion for coupling the bike mount to a bike supporting unit. The bike supporting unit may be a member of a bike transport case, a bike carrier, a bike stand or a bike training arrangement. The bike mount may further comprise at least one convertible supporting portion adaptable to different bike axle mount types by means of the adapter as described before. The convertible supporting portion may be configured in a socket-type manner for at least partially receiving the adapter such that an adapter section to be used for supporting a bike is at least aligned with a support opening of the bike mount.

The bike mount may further comprise an additional supporting portion adapted for a predetermined bike axle mount type. For example, the additional supporting portion may be configured for receiving a thru axle of 20 mm diameter and providing a supporting width of 110 mm. The additional supporting portion may be arranged at a greater distance from the fixation portion than the convertible supporting portion. In this way, a better ground clearance for specific bike mount types is achieved. For example, if the bike mount type is a fork, in particular a fork as it is used in downhill bikes, better ground clearance may be needed due to the construction of the fork.

The bike mount may comprise a recess separating the convertible supporting portion into two distinct support members arranged at a distance from each other such that the adapter is insertable into the convertible supporting portion from inside.

Disclosed is also a bike mount system comprising a bike mount as described before as well as an adapter as described before wherein the adapter is mountable on one side of the bike mount in at least two different ways.

Further disclosed is a bike carrier. The bike carrier may comprise a bike mount system as described before. Furthermore, the bike carrier may comprise an elongate supporting profile. The bike mount system may be coupled to the elongate supporting profile. The bike carrier may further comprise a coupling portion fixed to the elongate supporting profile. The coupling portion may be configured for mounting the bike carrier to a carrying device. The carrying device may be a cross bar of the type mountable on a vehicle roof or may be a support portion of a bike carrier case.

Further disclosed is a bike carrier case comprising a support portion. The support portion may be a lower hard case support tray. The bike carrier case may further comprise a bike carrier as described before. The bike carrier may be mounted to the support portion. The bike carrier may be releasably mountable to the support portion by means of the coupling portion.

Additional features and advantages may be gleaned by the person skilled in the art from the following description of exemplary embodiments, which are not to be construed as limiting, however, drawing reference to the attached drawings.

BRIEF DESCRIPTION OF THE DRAWINGS

The present disclosure will hereinafter be described in conjunction with the following drawing figures, wherein like numerals denote like elements.

All figures are only schematic depictions of exemplary embodiments in which, in particular, distances and dimensional correlations are not presented to scale.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
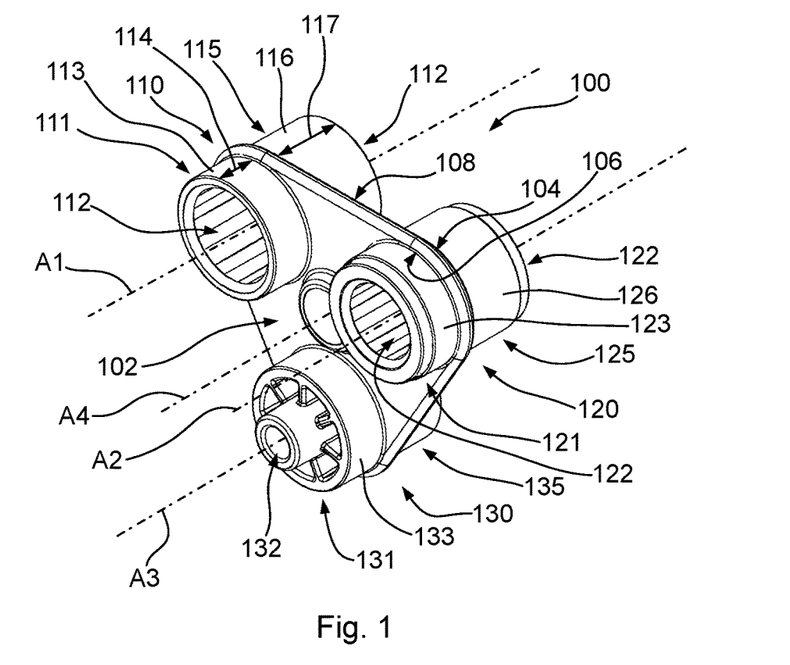
FIG. 1 shows a perspective view of an adapter fixable to a bike mount according to an embodiment.

FIG. 1 shows a perspective view of an adapter 100 according to an embodiment. The adapter 100 is configured as multiway adapter. Accordingly, the adapter 100 provides at least two different configurations allowing to at least partially adapt a bike mount 200 (see FIGS. 2 and 3) to at least two different bike axle mount types. In other words, by using the adapter, the dimensions of a bike mount 200 may be changed in at least two different ways so that it is possible to selectively support at least two different bike axle mount types on the bike mount 200 by using one and the same adapter 100. For that, the adapter 100 may be configured mountable on the bike mount 200 in at least two different ways.

According to the present disclosure, the term "bike axle mount type" may refer to features or a group of features provided on a bike and/or allowing to fix a wheel or wheel hub to the bike. Accordingly, a "bike axle mount" may comprise portions or elements of a bike frame and/or of a bike fork and may refer to dimensions of such portions or elements allowing to fix a wheel to a bike, for example to a space on the bike which is necessary for receiving the hub of a wheel or the type of axle which is used for fixing the wheel including a thru axle or a quick release skewer type axle.

In the context of the present disclosure, "at least partially adapt" shall mean that the adapter itself does not have to have the capability to completely change the dimensions of the bike mount 200 to the bike axle mount type to be mounted thereto. Such a definition also includes a configuration of the adapter 100 in which the adapter 100 needs to be used in combination with a further adapter, for example an identical adapter 100, for changing the size of the bike mount 200 to the desired bike axle mount type. For example, the adapter 100 as described herein can be mounted on one side of a bike mount 200 and a further adapter, for example an identical adapter 100, may be mounted on the opposite side of the bike mount 200. Both adapters in combination may then provide the desired configuration of the bike mount 200, in particular the desired width and/or desired opening dimension for supporting the desired bike axle mount type and available space between dropouts of the bike. In other words, a total width to be added to the bike mount 200 may be provided by two adapters, for example by two adapters 100 comprising the same height or length, so that the adapters bridge the gap between frame or fork dropouts and the bike mount 200 and thus adapt the bike mount 200 to a specific wheel hub dimension used on the bike.

The adapter 100 according to the embodiment is directly couplable to the bike mount. In other words, the adapter may be directly fixed on a bike mount without the necessity of further parts for fixing the adapter on the bike mount. For example, the adapter 100 may be configured as an insert insertable into an opening of the bike mount. Hence, at least a portion of the adapter may be insertable in a mating portion of the bike mount 200. Such a portion may be a mounting portion specifically designed to serve the only purpose of coupling the adapter to the bike mount 200 or may be a portion having an additional function besides such a coupling function. The adapter 100 is configured such that it is insertable on or into the bike mount 200 in two different ways. Alternatively, the adapter 100 may be indirectly couplable to the bike mount, for example by means of an axle for mounting a bike to the bike mount. If the adapter 100 is indirectly couplable to the bike mount, a further element is needed to hold the adapter on the bike mount such that the same remains on the bike mount.

In general, the adapter 100 may comprise multiple different adapter sections 111, 115, 121, 125, 131. Each adapter section 111, 115, 121, 125, 131 may be configured to provide a support for a specific kind of bike axle mount type. Accordingly, each adapter section 111, 115, 121, 125, 131 may provide a unique dimensional change to the bike mount 200 when mounted thereon in a use position. In the embodiments shown in FIGS. 1 to 5, adapter sections 111, 115, 121, 125 are configured for mounting a thru axle mount type bike and adapter section 131 is configured to support a quick release skewer axle mount type bike.

In general, the adapter sections 111, 115, 121, 125 have dimensions that allow to adapt the bike mount 200 to different thru axle types and to different dropout dimensions of a bike, for example to different available spaces between the bike frame tips or between bike fork tips. The available space, in particular the distance between the bike frame tips and the bike frame fork tips may also be referred to as the distance between the dropouts of the bike frame or the bike fork and may also be referred to as over-locknut dimension (O.L.D.).

As already mentioned before, the adapter 100 may be configured to selectively and at least partially adapt the bike mount 200 to at least two dimensions that allow to accommodate and support different axle types on the bike mount 200 and/or to arrange the bike mount 200 together with one or more adapters 100 in differently sized available spaces between bike frame tips or bike fork tips. In other words, the adapter 100 allows to provide a support for differently dimensioned dropouts of the bike frame or of a bike fork. In order to provide a support for a bike, the distance in between the bike frame tips or the bike fork tips may be relevant for clamping the bike frame or the bike fork on the bike mount including one or more adapters, by means of a thru axle or a quick release skewer. Thus, the adapter 100, in particular the adapter sections, may comprise a height or length that respectively add a width to the bike mount 200 up to the necessary distance in between the bike dropouts in the bike frame or in the bike fork.

At least one adapter section 111, 121 may comprise a first height or first length 114 that at least partially adapts the width of a bike mount 200 to a first total width, for example a first total width of 100 mm. Furthermore, at least one adapter section 115, 125 may comprise a second height or second length 117 that adapts the width of bike mount 200 to a second total width of 110 mm. In a further embodiment, at least one adapter section may comprise a third length which adapts the width of the bike mount 200 to third total width of 150 mm. Accordingly, the adapter 100 alone or in combination with a further adapter 100 may be able to enlarge the width of the bike mount 200 to different over-locknut dimensions (O.L.D.) so that the bike mount 200 together with the at least one adapter 100 matches the available space in the bike frame between the fork tips or the frame tips (dropouts).

At least one adapter section 111, 115 may comprise a first opening 112 having a first inner diameter for supporting a thru axle with a specific first outer diameter. For example, the first opening 112 may have a first inner diameter of 15 mm for supporting a thru axle with an outer diameter of 15 mm. At least one adapter section 121, 125 may comprise a second opening 122 having a second inner diameter for supporting a thru axle with a specific second outer diameter. For example, the second opening 112 may have a second inner diameter of 12 mm for supporting a thru axle with an outer diameter of 12 mm. The first and the second openings 112, 122 may be cylindrical openings with a cylindrical inner surface. The cylindrical inner surface may comprise recesses extending in longitudinal direction or axial direction A1, A2 of the cylindrical openings. In this way, the contact surface between a thru axle to be inserted and the inner surface may be reduced in order to facilitate a mounting and dismounting process of the thru axle since friction between the thru axle and the inner surface is reduced with a reduced size of a contact surface.

In the exemplary configuration as shown in the Figures, the adapter sections 111, 115 are configured to provide a support for a thru axle having an outer diameter of 15 mm. For that, the adapter sections 111, 115 comprise an opening 112 with an inner diameter of 15 mm allowing to receive a thru axle with a corresponding outer diameter. Furthermore, the adapter sections 121, 125 are configured to provide a support for a thru axle having an outer diameter of 12 mm. For that, the adapter section 121, 125 comprise an opening 122 with an inner diameter of 12 mm allowing to receive a thru axle with a corresponding outer diameter. The adapter sections 111, 121 according to the exemplary configuration further comprise a first length or first height 114 for extending the width of a bike mount 200 to a first total width of 100 mm. Accordingly, each adapter section 111, 121 adds a first length or first height 114 to the width of the bike mount 200 when the respective adapter section is mounted on the bike mount 200 in use position. The adapter sections 115, 125 according to the exemplary configuration further comprise a second length or second height 117 for extending the width of a bike mount 200 to a second total width of 110 mm. Accordingly, each adapter section 115, 125 adds a second length or second height 117 to the width of the bike mount 200 when the respective adapter section is mounted on the bike mount 200 in a use position. It is noted that a use position is to be understood as a position in which the respective adapter section is mounted on the bike mount 200 such that it protrudes from the same in width or cross direction (y-direction in FIGS. 2 to 4).

According to an embodiment, the adapter section 115 and the adapter section 111 share an opening 112 with continuously constant diameter. Accordingly, the adapter section 115 and the adapter section 111 can be coaxially arranged. The opening 112 can be a cylindrical through opening ranging from one side of the adapter 100 to the other opposite side of the adapter 100. In other words, the opening 112 extends through the adapter section 111 on one side of the adapter 100 and continues through the adapter section 115 on the opposite side of the adapter 100. Accordingly, when a thru axle is inserted in the adapter 100, the thru axle extends through both adapter sections 111, 115.

In the present configuration, the adapter section 125 and the adapter section 121 share the same opening 122. Accordingly, the adapter section 125 and the adapter section 121 are coaxially arranged. The opening 122 is a cylindrical opening ranging from one side of the adapter 100 to the other opposite side of the adapter 100. In other words, the opening 122 extends through the adapter section 121 on one side of the adapter 100 and continues all the way through the adapter section 125 on the opposite side of the adapter 100. Accordingly, when a thru axle is inserted in the adapter section 125 or the adapter section 121, the thru axle always extends through both adapter sections 121, 125.

The adapter section 131 is configured to provide a support for a quick release skewer axle and comprises an opening 132 for receiving the quick release skewer axle. Furthermore, the adapter section 131 comprises a protrusion with an outer surface for supporting dropouts of a bike frame or a bike fork.

The adapter sections 111, 115, 121, 125, 131 including their respective openings 112, 122, 132 as provided therein extend along their respective middle axes A1, A2, A3. In the present configuration, the adapter sections 111, 115, 121, 125, 131 are configured such that their middle axes A1, A2, A3 are paraxially arranged. According to the embodiment, the adapter sections 111, 115, 121, 125, 131 are arranged about a middle axis A4 of the adapter 100. The middle axis A4 may also be referred to as rotational axis A4 as the position of the adapter sections 111, 115, 121, 125, 131 with respect to the bike mount 200 may be changed by rotating the adapter 100 about the rotational axis A4. The middle axes A1, A2, A3 may extend in parallel with the rotational axis A4.

In the embodiment, the adapter sections 111, 115, 121, 125, 131 are arranged in adapter portions 110, 120, 130. In some adapter portions 110, 120 of the adapter portions, two of the adapter sections 111, 115, 121, 125 may be grouped. In the exemplary embodiment as shown in the Figures, the adapter sections 111, 115 are arranged in a first adapter portion 110. The adapter sections 121, 125 are arranged in a second adapter portion 120. The adapter section 131 is arranged in a third adapter portion 130. Unlike the other adapter portions 110, 120, the third adapter portion 130 only provides a single supporting option for a quick release skewer type bike axle mount. In order to couple the third adapter portion 130 to the bike mount, the adapter 100 comprises a coupling protrusion 135 in the third adapter portion 130, for coupling the adapter portion 130 to the bike mount 200.

In some embodiments, the adapter sections 111, 115, 121, 125, 131 comprise a body which is at least partially formed about the middle axes A1, A2, A3. Accordingly, the adapter sections 111, 115, 121, 125, 131 may extend along such middle axes (y-direction in some Figures). In some configurations, the adapter sections 111, 115, 121, 125, 131 may at least partially comprise a rotation body section or solid of revolution section. In other words, the adapter sections 111, 115, 121, 125, 131 may at least partially be formed as a rotation body or solid of revolution. In some embodiments, at least one of the adapter sections 111, 115, 121, 125 may at least partially be formed as a hollow cylinder or may comprise a hollow cylindrical portion. Accordingly, in some embodiments, the adapter sections 111, 115, 121, 125, 131 may comprise cylindrical outer circumferential surfaces 113, 116, 123, 126, 133. In some embodiments, the outer diameter of the cylindrically formed adapter sections 111, 115, 121, 125, 131 may be identical. In this way, the adapter sections 111, 115, 121, 125, 131 may be configured insertable into one and the same opening 204 in a bike mount 200 thereby forming a coupling portion or coupling protrusion as will be described later.

Two of the adapter sections 111, 115, 121, 125 may be arranged adjacent to each other in axial extension direction of the same. In other words, to adapter sections 111, 115 or 121, 125 may be arranged such that one adapter section 115, 125 may continue from a respective axial end portion of the adapter sections 111, 121. The openings 112, 122 of the adjacent adapter sections 111, 115, 121, 125 comprise an identical diameter, respectively, so that in some configurations, the openings 112, 122 extend through both adapter sections 111, 115, 121, 125. In this way, it is possible to accommodate an axle with a predetermined diameter in the openings of the adapter sections.

In some embodiments, the adapter sections 111, 115 or 121, 125 which may respectively share one of the above-mentioned openings 112, 122, may be directly coupled to each other such that there is at least partially a substantially seamless transition from one of the outer circumferential surfaces 113, 116 or 123, 126 to the other adjacent circumferential surface. In some embodiments, the adapter sections 111, 115 and/or 120, 125 comprise a coupling portion 102. The coupling portion 102 may couple the adapter sections to each other and/or may be provided to couple the adapter 100 to the bike mount 200. The coupling portion 102 may serve as a stop for correctly positioning the adapter 100 in the bike mount. An arrangement may be provided in which the adapter sections 111, 115, 121, 125, 131 extend from such a coupling portion 102 either from one side or from opposite sides of the coupling portion 102.

The coupling portion 102 may extend in a direction perpendicular to the extension directions or middle axes A1, A2, A3 of the adapter sections and/or may extend along a plane perpendicular to the middle axes A1, A2, A3. The coupling portion 102 may be a plate-like member. The coupling portion 102 may be polygonal, for example triangular, with the adapter sections 111, 115, 121, 125, 131 being arranged in corner regions of such a polygon, for example equidistant to a middle axis A4 of the adapter 100 wherein the middle axis A4 extends perpendicular to the plate-like coupling portion 102. Accordingly, the position of the adapter portions 110, 120, 130 may be changed by rotating the adapter 100 about the middle axis A4 of the adapter 100. In other words, the position of the adapter portions 110, 120, 130 relative to the bike mount 200 may be changed by flipping the adapter 100.

It is possible to provide some or all adapter sections 111, 115, 121, 125, 131 on one side of the coupling portion 102 and to provide a mounting portion on the opposite side. As an example of such a configuration, the adapter portion 130 comprises only one adapter section 131 which as an exemplary embodiment is configured to support a quick release skewer type bike dropout. In other words, the adapter section 131 is configured to receive a quick release skewer axle in an opening 132 which is provided in a protrusion that is configured to support a fork end or a frame end of a bike. The adapter section 131 is provided on one side of the coupling portion 102. On the opposite side of the coupling portion 102, a coupling portion 135 may be provided which has the only purpose of coupling the adapter 100 to a bike mount. In the embodiment as shown, the coupling portion 135 is configured insertable into an opening 204 of the bike mount but does not comprise specific features other than necessary for mounting the adapter to the bike mount such that the adapter section 131 is rendered available for supporting a bike thereon. Similar coupling portions like the coupling portion 135 may be provided for and assigned to adapter sections.

If two adapter sections 111, 115 or 121, 125 are grouped in a single adapter portion 110 or 120, a very compact adapter 100 may be provided. In such a configuration, the adapter sections have a double function, namely to add the desired dimensional change to the bike mount and to have the ability to support the adapter on the bike mount 200. Each adapter section may thus be configured insertable into the same opening 204 of a bike mount 200 for coupling the adapter 100 to the bike mount 200 thereby rendering the inserted coupling section inactive and rendering the other coupling section of the adapter portion active and ready for use. Some of the adapter sections 111, 115, 121, 125 may, thus, comprise the additional function of being configured to serve as a coupling portion in a manner as described above with respect to the coupling portion 135. As already mentioned above, the latter mentioned adapter sections may comprise outer circumferential surfaces with an identical outer radius. In this way, the adapter sections are configured to be received in one and the same opening in a bike mount having a corresponding inner diameter. Accordingly, dependent on which adapter section is inserted into such an opening, an opposite adapter section is rendered available and functional for supporting a bike thereon.

Although not shown in the drawings, the following modifications are conceivable. According to a modification, the adapter may only comprises one adapter portion, for example the adapter portion 110 or the adapter portion 120 as shown in FIG. 1. In this way, an adapter providing two different mounting options on a bike mount 200 may be provided. In such an adapter, the coupling portion 102 may be embodied as a ring-like protrusion, either a continuous ring-like protrusion or an intermitted ring-like protrusion extending about the middle axis and provided at a transition portion between the adapter sections. In this way, the coupling portion 102 may serve as a stop when the adapter is inserted into an opening of a bike mount. In the exemplary configuration as shown in FIG. 1, the adapter 100 is configured as multiway adapter in that it comprises five adapter sections and is configured to adapt a bike mount 200 to five different configurations. According to a modification, it is possible to provide an adapter with less or more than five different configuration possibilities but with at least two different configuration possibilities.

Figure 2:
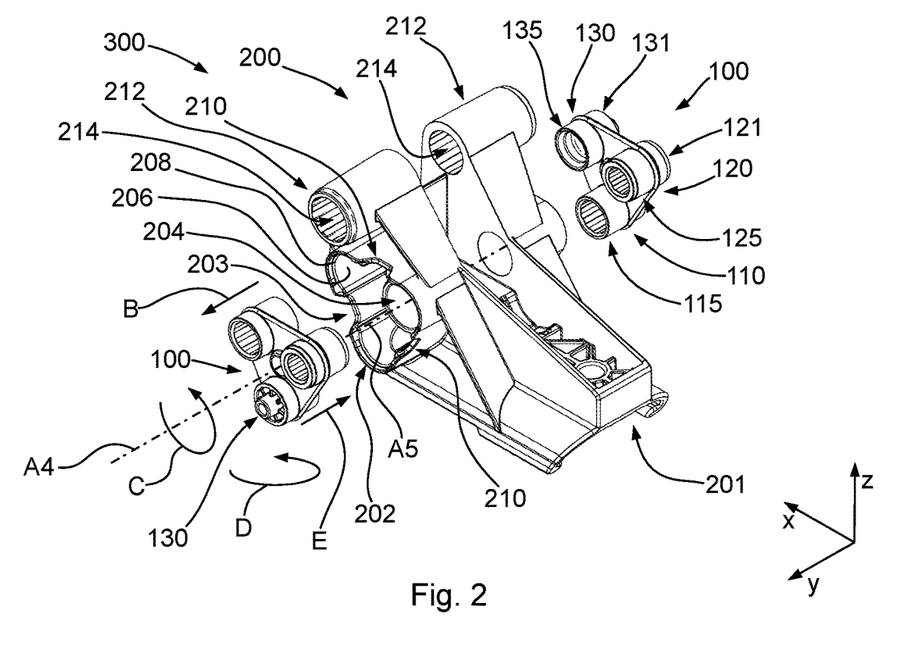
FIG. 2 shows an exploded view of a bike mount system according to an embodiment.

A bike mount 200 according to an embodiment is shown in FIG. 2. The bike mount 200 comprises a fixation portion 201 for coupling the bike mount 200 to a bike supporting unit, for example an elongate supporting profile 402 of a bike carrier 400. The bike mount 200 may be used to support a bike fork or a bike frame. Thus, the bike mount 200 may be used as a front hub or a rear hub for mounting the bike to the supporting member.

The bike mount 200 comprises a convertible supporting portion 202 adaptable to different bike axle mount types by means of an adapter 100 as described before. The convertible supporting portion 202 is configured in a socket-type manner for at least partially receiving the adapter 100. Accordingly, the convertible supporting portion 202 and the adapter 100 may be configured in a plug and socket type manner so that the adapter 100 may be plugged into the supporting portion 202. For that, the supporting portion 202 may comprise a support opening 204 configured to receive a mounting portion of the adapter 100. As already mentioned before, some of the adapter sections may be configured such that they can be accommodated in the support opening 204. In other words, the adapter sections may additionally form mounting portions and may thus have a double function. The support opening 204 may comprise an inner diameter corresponding to an outer diameter of the adapter sections or mounting portions. The support opening 204 may define a portion of an accommodating recess 203 in which the adapter 100 is insertable. In the present embodiment, the accommodating recess 203 is configured to receive one side of the adapter 100, more precisely the adapter sections 115, 125 and the mounting portion 135 on one side of the coupling portion 102.

Furthermore, the accommodating recess 203 is configured to at least partially receive the coupling portion 102. The accommodating recess 203 may comprise one or more contact sections 206 being at least partially formed corresponding to or following a portion of an outer circumferential surface of the adapter sections or mounting portions or of the coupling portion 102. In this way, the contact sections 206 may serve as positioning portions that mate with a positioning portion on the adapter, for example an outer circumferential surface of some adapter sections. In an embodiment, the positioning portion 104 may be an edge portion 106 of the coupling member 102.

All adapter sections and mounting portions on one side of the coupling portion 102 can be accommodated in the accommodating recess 203 wherein one of the adapter sections or a mounting portion is inserted into the support opening 204. The support opening 204 defines a middle axis A5 and is configured to receive an adapter section or mounting portion. The support opening 204 is further configured as through opening so that an axle may be passed through the entire bike mount 200 in width or cross direction (y-direction in the drawings). According to an embodiment, an adapter section which is not inserted into the support opening 204 but is aligned with the support opening such that the middle axis A5 and a middle axis A1, A2, A3 of the adapter section are coaxially arranged may be referred to as active adapter section. In other words, such an adapter section is in use position. An edge portion of the convertible supporting portion 202, more precisely an edge portion defining an opening of the convertible supporting portion 202 comprises a recess 208 creating a step surface in the inner wall of the supporting portion 202. This step surface extends in a vertical plane of the bike mount 200 (x-z-plane in the drawings) and acts as a stop in width direction of the bike mount 200 (in y-direction). The step surface is configured to get in contact with the coupling portion 102 thereby defining an abutment limiting a movement of the adapter in cross direction (y-direction). In this way, it is predetermined how far the adapter may be inserted into the convertible supporting portion. Accordingly, the step surface may also be referred to as a reference abutment portion allowing to position the adapter at a predetermined position. With such an arrangement, a reference position in cross direction (y-direction) is achieved allowing to exactly determine the lengths/heights of the adapter sections that are necessary to extend the width of the bike mount 200 to the desired total width.

The convertible supporting portion 202 may be configured corresponding to the shape of the coupling portion 102 and may in particular be formed such that the coupling portion 102 entirely covers an opening of the convertible supporting portion 202. Accordingly, when the adapter 100 is correctly inserted in the supporting portion 202, a transition between the adapter and the supporting portion may be seamless. The supporting portion 202 may be configured to receive the adapter in a snap-fit type manner. In other words, when inserting the adapter in the supporting portion 202, the adapter may snap into place. In order to facilitate a dismounting operation, the supporting portion may comprise recesses 210 in the edge portion allowing to access a space between the coupling portion 102 and the supporting portion 202. Accordingly, the recesses protrude further into the bike mount 200 in y-direction than the above mentioned recess 208 for creating the step surface. In this way, a user may grasp the adapter 100 for pulling the same out or may insert a tool for dismounting the adapter 100. In particular, a user may grasp a gripping portion 108 in an edge portion 106 of the coupling portion 102. The recesses 210 may be cutouts protruding towards the inside of the bike mount 200 (in y-direction). As is also visible from FIG. 2, the convertible supporting portion 202 may comprise a triangular shape with rounded corners when viewed in cross direction (y-direction) of the bike mount 200. This shape corresponds to the shape of the coupling portion 102.

The bike mount according to the embodiment as shown in the Figures further comprises an optional additional supporting portion 212 adapted for a predetermined bike axle mount type, namely for receiving a thru axle of 20 mm diameter and to provide a supporting width of 110 mm. As is directly visible form FIG. 2, this additional supporting portion 212 is arranged at a greater distance from the fixation portion 201 than the convertible supporting portion 202 in order to provide a better ground clearance for specific bike mount types, in particular for specific fork types.

Figure 3:
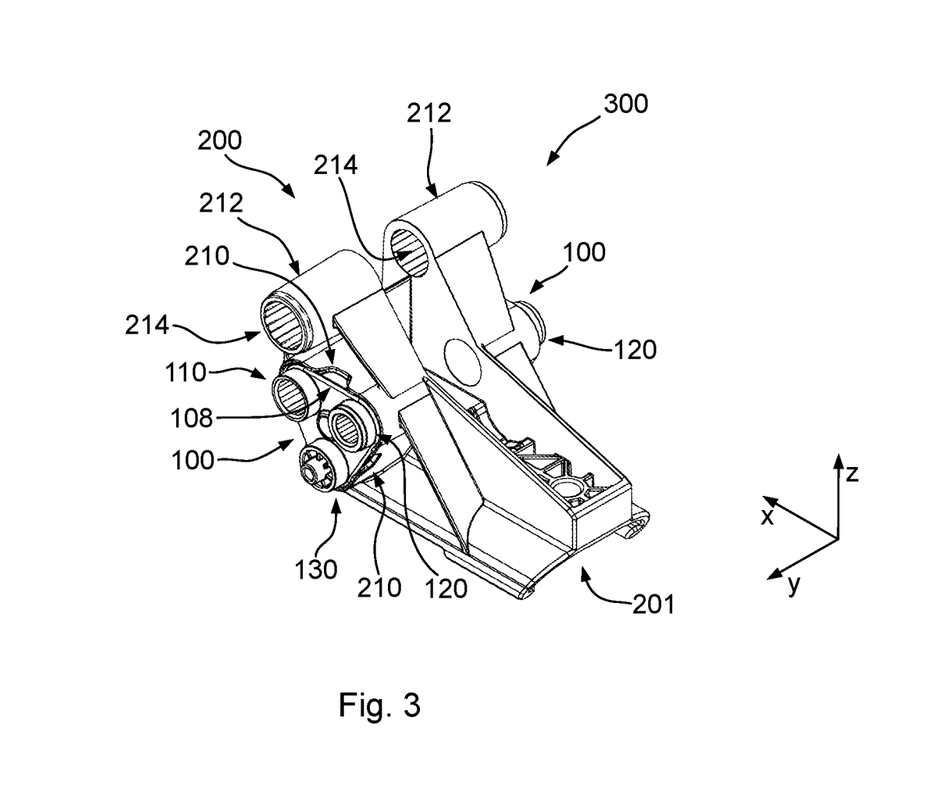
FIG. 3 shows an assembled view of the bike mount system of FIG. 2.

In the following, it will be described how the adapter 100 can be mounted to the bike mount 200 and how the adapter portions and sections may be switched or changed on the bike mount 200. A bike mount system 300 comprising two adapters 100 and a bike mount 200 is shown in FIGS. 2 and 3. FIG. 2 is an exploded view of the bike mount system 300 in which the adapters 100 are shown in a dismounted state and FIG. 3 shows the bike mount system 300 in a state in which the adapters 100 are mounted on the bike mount 200. In the exemplary embodiment as shown in FIGS. 2 and 3, the adapter sections 121 are positioned for use and the adapter sections 125 are arranged to be inserted into the openings 204 of the supporting portion 202. Accordingly, the middle axis A2 of the adapter portion 120 is aligned with the middle axis A5 of the opening 204 so that the adapter sections 125 may be inserted into the openings 204 by moving the adapters in cross direction towards the bike mount 200 (along the y-axis direction).

FIG. 3 shows a state in which the adapters 100 are inserted and the coupling sections 121 protrude from the bike mount 200. In this state, the bike mount system 300 is ready for use. In order to switch the configuration of the bike mount system 300, the adapters 100 may be disengaged from the bike mount 200 by pulling them away from the bike mount 200 and out of the convertible supporting portion 202, for example in the direction of arrow B as shown in FIG. 2. As soon as the adapters 100 are removed from the bike mount 200, the adapters may be rotated in the direction of arrow C about axis A4 and/or may be turned in the direction of arrow D about an axis perpendicular to the axis A4 in order to reverse the arrangement of the adapter 100. As soon as the desired mounting portion is aligned with the opening 204 and oriented such that the desired adapter section is positioned on a side of the adapter facing away from the bike mount, the adapter can be reinserted into the supporting portion 202 by moving the adapter in cross direction of the bike mount along the y-axis and towards the bike mount 200. As soon as the adapter is inserted in the convertible supporting portion 202, the dimension of the bike mount 200 is changed and the bike mount 200 is ready for use.

Figure 4:
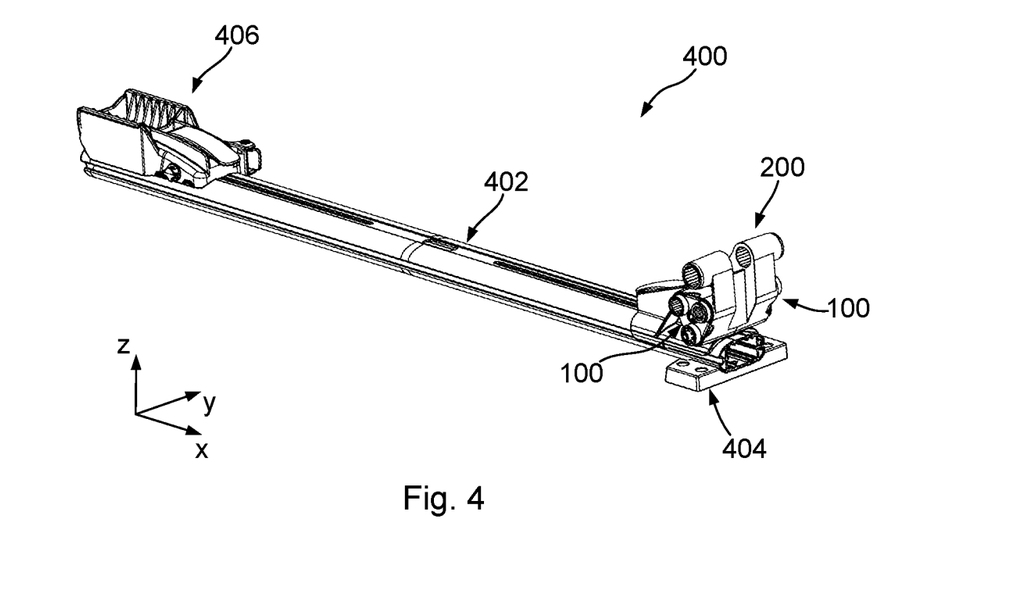
FIG. 4 shows a perspective view of the bike carrier according to an embodiment.

A bike carrier 400 is shown in FIG. 4. The bike carrier 400 comprises a bike mount system 300 as described before. Furthermore, the bike carrier 400 comprises an elongate supporting profile 402. The bike mount 200 is mounted on an upper side of the elongate supporting profile 402. In addition, the bike carrier 400 may comprise a coupling portion 404 fixed to the elongate supporting profile 402, for example from below. The coupling portion 404 may comprises a fixation portion for fixing the coupling portion on a carrying arrangement, for example on a crossbar of a load carrying system of a vehicle or on a lower supporting portion of a bike carrier case.

In the embodiment, the bike mount 200 is mounted on a forward end portion of the elongate supporting profile 402. The elongate supporting profile may be made from aluminum. The front rear direction of the bike carrier 400 extends along the x-axis as shown in FIG. 3. On a rear end portion of the elongate supporting profile 402, a wheel support 406 is mounted for supporting a rear wheel of a bike when the bike is fixed to the bike mount 200. However, according to an exemplary modification, a bike mount 200 serving as a rear hub for supporting a bike frame may be provided instead of the wheel support 406.

Figure 5:
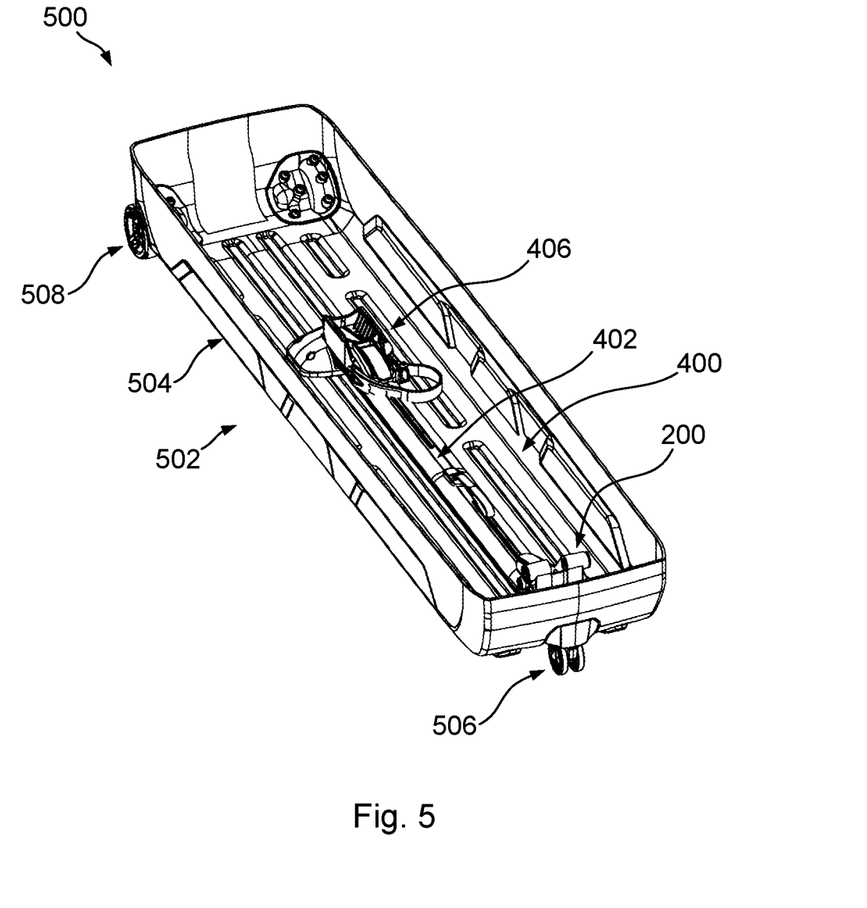
FIG. 5 shows a perspective view of a bike carrier case according to an embodiment.

FIG. 5 shows a bike carrier case 500, in particular a lower supporting portion 502 being formed as a support tray 504. The lower supporting portion 502 may be a hard case. The bike carrier case 500 comprises a front wheel assembly 506 and a rear wheel assembly 508 allowing to roll the bike carrier case 500 on the ground for easier transport. Furthermore, a bike carrier 400 as described before is mounted on the support tray 504. In an exemplary embodiment, the bike carrier 400 is releasably mountable on the bike carrier case 500. In this way, a bike to be transported may first be coupled to the bike carrier 400. After that, the bike carrier 400 including the bike to be transported can be mounted on the support tray 504.

In conclusion a, it is pointed out that the terms like "comprising" or the like are not intended to rule out the provision of additional elements or steps. Let it further be noted that "a" or "an" do not preclude a plurality. In addition, features described in conjunction with the different embodiments can be combined with each other however desired. It is also noted that the reference numbers in the claims are not to be construed as limiting the scope of the claims. Moreover, while at least one exemplary embodiment has been presented in the foregoing summary and detailed description, it should be appreciated that a vast number of variations exist.

It should also be appreciated that the exemplary embodiment or exemplary embodiments are only examples, and are not intended to limit the scope, applicability, or configuration in any way. Rather, the foregoing summary and detailed description will provide those skilled in the art with a convenient roadmap for implementing an exemplary embodiment, it being understood that various changes may be made in the function and arrangement of elements described in an exemplary embodiment without departing from the scope as set forth in the appended claims and their legal equivalents.

What is claimed is:

1. An adapter for a bike mount, the adapter comprising:
a coupling plate;
a first adapter section coupled to the coupling plate; and
a second adapter section coupled to the coupling plate,
wherein the first adapter section is configured to receive a first bike axle,
wherein the second adapter section is configured to receive a second bike axle different than the first bike axle, and
wherein the first adapter section and the second adapter section are integrally formed with the coupling plate.

2. The adapter of claim 1, wherein the first adapter section defines a first opening configured to receive the first bike axle,
wherein the second adapter section defines a second opening configured to receive the second bike axle, and
wherein an inner diameter of the second opening is greater than an inner diameter of the first opening.

3. The adapter of claim 1, wherein the first adapter section is configured to receive a thru axle, and
wherein the second adapter section is configured to receive a quick release skewer axle.

4. The adapter of claim 1, wherein the first adapter section comprises a first barrel extending away from the coupling plate and having a first extension length, and
wherein the second adapter section comprises a second barrel extending away from the coupling plate and having a second extension length that is greater than the first extension length.

5. The adapter of claim 1, wherein a middle axis of the first adapter section is parallel to a middle axis of the second adapter section.

6. The adapter of claim 1, wherein the first adapter section extends from a first surface of the coupling plate,
wherein the second adapter section extends from a second surface of the coupling plate, and
wherein the first surface and the second surface are disposed on opposite sides of the coupling plate.

7. The adapter of claim 1, wherein the first adapter section extends from a first side of the coupling plate, and
wherein the second adapter section extends from the same side of the coupling plate.

8. The adapter of claim 1, wherein the first adapter section and the second adapter section are arranged coaxially.

9. A bike mount system comprising:
a bike mount comprising a convertible support portion, the convertible support portion having a support opening configured to receive a bike axle; and
an adapter configured to mount to the bike mount, the adapter comprising:
a first adapter section configured to align with the support opening and receive a first bike axle when the adapter is mounted to the bike mount in a first orientation, and
a second adapter section configured to align with the support opening and receive a second bike axle when the adapter is mounted to the bike mount in a second orientation,
wherein the bike mount and the adapter have a first combined width when the adapter is mounted to the bike mount in the first orientation,
wherein the bike mount and the adapter have a second combined width when the adapter is mounted to the bike mount in the second orientation, and
wherein the first combined width is different than the second combined width.

10. The adapter of claim 9, wherein the adapter is configured to be moved from the first orientation to the second orientation by rotating the adapter about a rotational axis.

11. The adapter of claim 10, wherein the rotational axis is orthogonal to a middle axis of the first adapter section and a middle axis of the second adapter section.

12. The bike mount system of claim 9, wherein the adapter further comprises a third adapter section configured to align with the support opening and receive a third bike axle when the adapter is mounted to the bike mount in a third orientation,
wherein the first adapter section defines a first opening configured to receive the first bike axle when the adapter is mounted to the bike mount in the first orientation,
wherein the third adapter section defines a third opening configured to receive the third bike axle when the adapter is mounted to the bike mount in the third orientation, and
wherein an inner diameter of the first opening is greater than an inner diameter of the third opening.

13. The adapter of claim 12, wherein the adapter is configured to be moved from the first orientation to the second orientation by rotating the adapter about a first axis, and
wherein the adapter is configured to be moved from the first orientation to the third orientation by rotating the adapter about a second axis perpendicular to the first axis.

14. The bike mount system of claim 12, wherein the adapter further comprises a fourth adapter section configured to align with the support opening and receive a fourth bike axle when the adapter is mounted to the bike mount in a fourth orientation,
wherein the first adapter section is configured to receive a thru axle, and
wherein the fourth adapter section is configured to receive a quick release skewer axle.

15. The bike mount system of claim 9, wherein the adapter further comprises a positioning portion and the bike mount further comprises a mating portion to receive the positioning portion of the adapter, and
wherein, when the positioning portion of the adapter is received by the mating portion of the bike mount, the adapter is disposed in the first orientation or the second orientation.

16. The bike mount system of claim 15, wherein the positioning portion is a portion of the first adapter section or the second adapter section.

17. The bike mount system of claim 9, further comprising a second adapter configured to mount to the bike mount, wherein the adapter and the second adapter are configured to mount to the bike mount on opposite sides of the support portion.

18. A bike carrier comprising:
a bike mount comprising a convertible support portion, the convertible support portion having a support opening configured to receive a bike axle; and
an adapter configured to mount to the bike mount, the adapter comprising:
- a first adapter section configured to align with the support opening and receive a first bike axle when the adapter is mounted to the bike mount in a first orientation, and
- a second adapter section configured to align with the support opening and receive a second bike axle when the adapter is mounted to the bike mount in a second orientation,
wherein the first adapter section and the second adapter section are configured to accommodate a different bike axle size or type.

19. The bike carrier of claim 18, wherein the adapter further comprises a third adapter section configured to align with the support opening and receive a third bike axle when the adapter is mounted to the bike mount in a third orientation, and
wherein the third adapter are is configured to accommodate a different bike axle size or type than the first adapter section and the second adapter section.

20. The adapter of claim 1, wherein the adapter is configured to be used in a first orientation and a second orientation,
wherein the adapter is configured to be moved from the first orientation to the second orientation by rotating the adapter about a rotational axis, and
wherein the rotational axis is orthogonal to a middle axis of the first adapter section and a middle axis of the second adapter section.

* * * * *

UNITED STATES PATENT AND TRADEMARK OFFICE
CERTIFICATE OF CORRECTION

PATENT NO. : 11,772,728 B2
APPLICATION NO. : 17/955197
DATED : October 3, 2023
INVENTOR(S) : Ardmar et al.

Page 1 of 1

It is certified that error appears in the above-identified patent and that said Letters Patent is hereby corrected as shown below:

In the Claims

In Column 14, Claim 10, Line 14, replace "adapter" with --bike mount system--.

In Column 14, Claim 11, Line 17, replace "adapter" with --bike mount system--.

In Column 14, Claim 13, Line 35, replace "adapter" with --bike mount system--.

In Column 16, Claim 19, Line 6, replace "third adapter are" with --third adapter--.

Signed and Sealed this
Thirtieth Day of January, 2024

Katherine Kelly Vidal
*Director of the United States Patent and Trademark Office*